United States Patent [19]

Becker et al.

[11] Patent Number: 5,291,668

[45] Date of Patent: Mar. 8, 1994

[54] STEAM ATMOSPHERE DRYING EXHAUST STEAM RECOMPRESSION SYSTEM

[75] Inventors: Frederick E. Becker, Reading; Leo A. Smolensky, Concord; Edward F. Doyle, Dedham; Francis A. DiBella, Roslindale, all of Mass.

[73] Assignee: Tecogen, Inc., Waltham, Mass.

[21] Appl. No.: 863,435

[22] Filed: Apr. 3, 1992

[51] Int. Cl.⁵ .......................................... F26B 19/00
[52] U.S. Cl. ........................................ 34/86; 34/219; 34/82
[58] Field of Search ............... 34/35, 85, 86, 17, 15, 34/219, 82, 11; 62/238.6

[56] References Cited

U.S. PATENT DOCUMENTS

| | | | |
|---|---|---|---|
| 2,567,940 | 9/1951 | Karrer et al. | 34/35 |
| 4,242,808 | 1/1981 | Lathi | 34/23 |
| 4,581,829 | 4/1986 | Becker et al. | 34/15 |
| 4,881,476 | 11/1989 | Becker et al. | 110/347 |
| 4,974,335 | 12/1990 | Bege et al. | 34/35 X |

FOREIGN PATENT DOCUMENTS 1558913  1/1980  United Kingdom .

OTHER PUBLICATIONS

"Spray Drying in Superheated Steam", *Drying*, Gauvin et al., 1980 pp. 320–331.
"Steam Recompression Drying", Large Scale Applifcations for Heat Pumps, 2nd Int'l Symposium, Heaton et al., Sep. 1984, pp. 177–178.
"Steam Drying: Heat Transfer in Steam Fluidized Beds", Third Australian Conference on Heat & Mass Transfer, Beeby et al., May 1985.
"Steam Dryer Aimed at Byproducts", *Food Engineering*, V55, N2, pp. 102–103 Robert O. Covington, 1983.
"Heat Pumps in Drying", Institute of Chemical Engineering, Zytta et al., 1985, pp. 129–141.

*Primary Examiner*—Henry A. Bennet
*Attorney, Agent, or Firm*—Lorusso & Loud

[57] ABSTRACT

This invention relates to a heated steam atmosphere drying system comprising dryer in combination with an exhaust recompression system which is extremely energy efficient and eliminates dangers known to air dryers. The system uses superheated steam as the drying medium, which recirculated through the system where its heat of evaporation and heat of compression is recovered, thereby providing a constant source of heat to the drying chamber. The dryer has inlets whereby feedstock and superheated steam are fed therein. High heat transfer and drying rates are achieved by intimate contact of the superheated steam with the particles being dried The dryer comprises a vessel which enables the feedstock and steam to enter recirculate together. When the feedstock becomes dry it will exit the dryer with the steam and become separated from the steam through the use of a curvilinear louver separator (CLS). The CLS enables removal of fine and ultrafine particles from the dryer. Water vapor separated from the particles in the CLS as superheated steam, may then be recovered and recirculated as steam through the use of a compressor to either directly or indirectly heat the dryer, and a heat exchanger or a heater to directly provide heat to the dryer. This system not only provides a very efficient heat transfer system but results in a minimum carry-over of ultrafine particles thereby eliminating any explosive hazard.

22 Claims, 17 Drawing Sheets

STEAM ATMOSPHERE DRYING EXHAUST STEAM RECOMPRESSION SYSTEM

CONTRACTUAL ORIGIN OF THE INVENTION

The United States Government has rights in this invention pursuant to Contract No DE-FC07-89ID12826 awarded by the United States Department of Energy.

BACKGROUND OF THE INVENTION

1. Field of the Invention

In the United States, industrial drying accounts for approximately 1.5 quads of energy use per year. Annual industrial dryer expenditures are estimated to be in the $500 million range. Clearly, industrial drying is a significant energy and monetary expense for the United States industrial complex. The present invention relates to the drying of granular, slurry, or liquid feeds in a novel drying vessel utilizing superheated steam as the drying medium.

2. Description of the Prior Art

Thermal drying of granular, slurry or liquid feeds has been accomplished in prior art devices through the use of devices which employ elements which remove water from the feedstock via evaporation. There are however, inherent risks in such processes in that such processes have explosive hazards associated therewith due to dust. Additionally, inherent is such devices is the need for large energy requirements which are obtained at a cost to our environment.

Attempts have been made to reduce the consumption of energy using exhaust waste heat recovery techniques, improved dryer designs, or even the deployment of advanced mechanical dewatering techniques. Despite these efforts, a large amount of heat of evaporation from the evaporated water cannot be recovered and/or in some way utilized.

SUMMARY OF THE INVENTION

The proposed invention seeks to overcome the disadvantages in the prior art by employing the use of a drying vessel capable of drying granular, slurry or liquid feeds whereby superheated steam is employed so as to improve the energy efficiency of the drying process.

This objective is accomplished through the use of a dryer in combination with an exhaust recompression system whereby superheated steam is recirculated therethrough to provide effective drying of particulate matter. Three heated steam atmosphere drying systems are disclosed which may accomplish this objective. The first system provides direct heat internally in the dryer through the use of heat transferred from a compressor and a heat exchanger to an inlet of the dryer. The second system provides indirect heat to the dryer by way of a steam jacket encasing the dryer. In this system, some direct heat is sent by recirculating via fan the steam from the output of a separator, back to an inlet of the dryer. The third system incorporates the features of the above two systems by providing both direct and indirect heating via a compressor communicating with a heat exchanger which provides direct heat to the dryer and the compressor communicating with a steam jacket to provide indirect heat.

Each system has in common high heat transfer and drying rates which are achieved by intimate contact of the superheated steam with the particles being dried. The drying chamber of each system has inlets whereby feedstock and superheated steam are fed therein. The drying chamber comprises a vessel which enables the feedstock to enter and circulate with the steam. When the feedstock becomes dry it will exit the dryer and separate from the steam through the use of a curvilinear louver separator (CLS). The CLS enables removal of fine and ultrafine particles from the dryer. Water vapor leaves the dryer and the CLS as superheated steam, a part of which is returned to the dryer via a heat exchanger and a heater. Another part may be passed to a bag filter which may be used in conjunction with the CLS, which enables ultrafine particles that may not have been captured by the CLS to be collected. The steam that exits therefrom is then condensed in a compressor to recover any liquid medium and/or water. This system not only provides a very efficient heat transfer system but results in a minimum carry-over of ultrafine particles thereby eliminating any explosive hazard.

DESCRIPTION OF THE PREFERRED EMBODIMENTS

Figure 1:
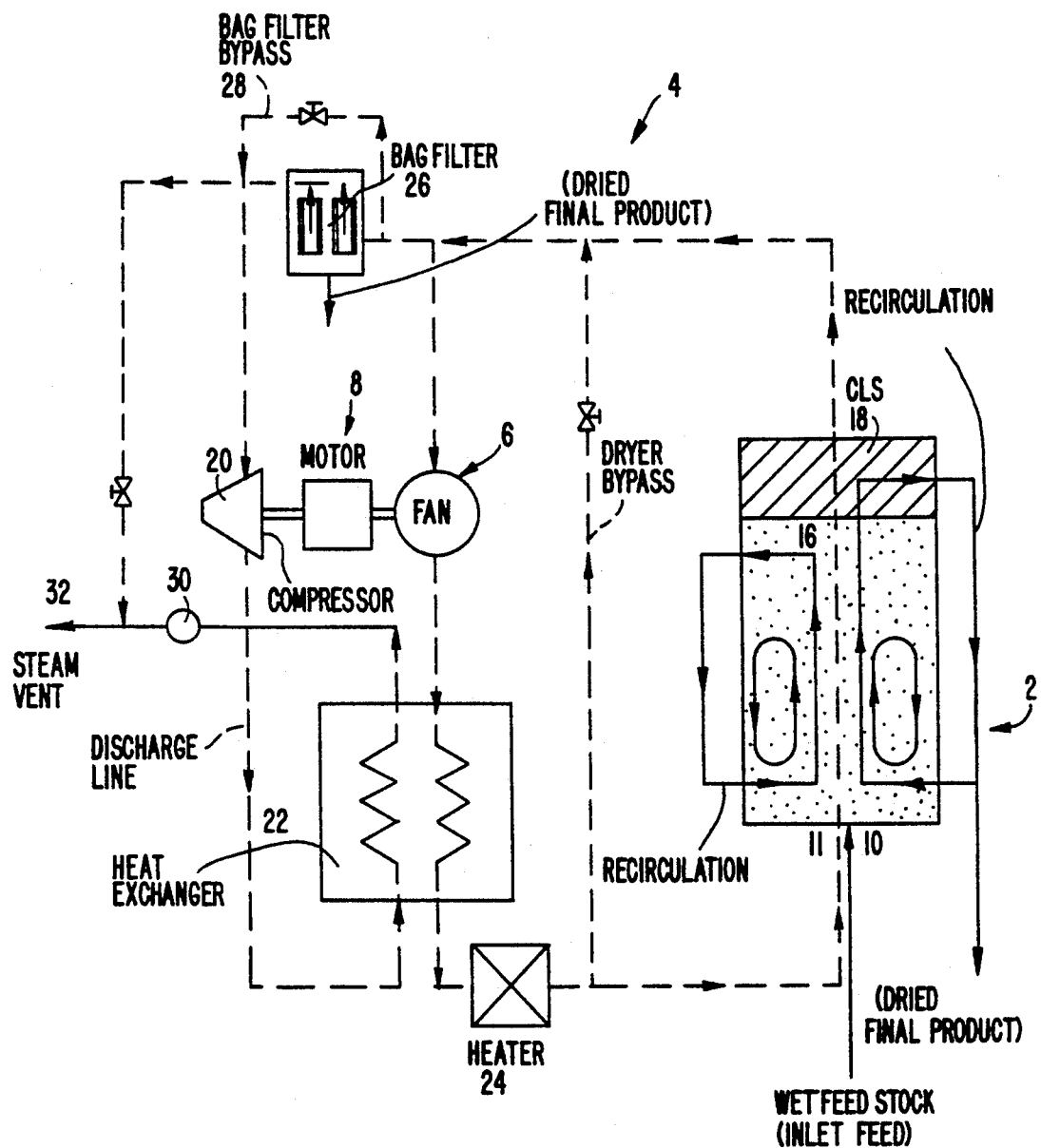
FIG. 1 illustrates a directly heated steam atmosphere drying (DSAD) system.
Figure 2:
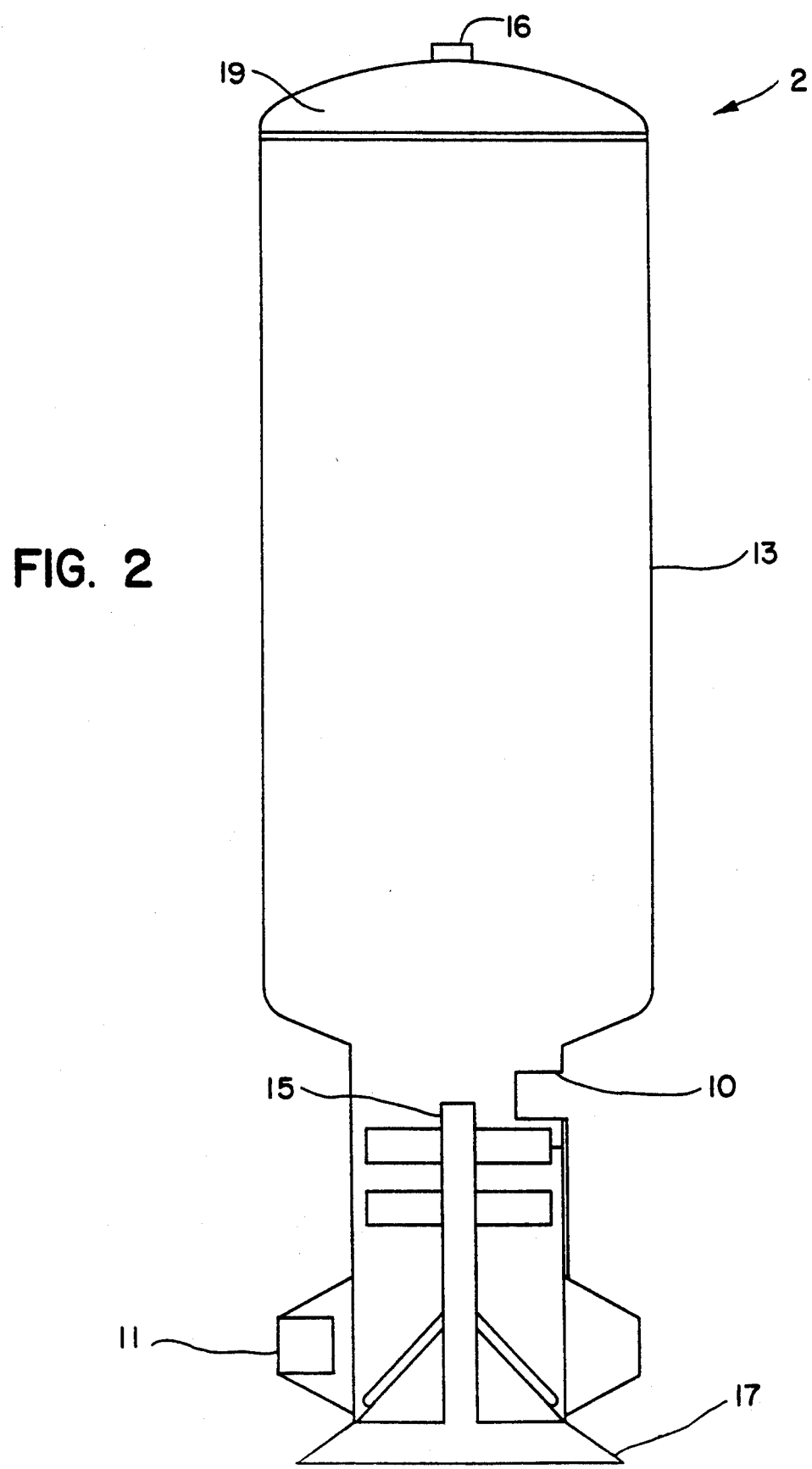
FIG. 2 illustrates a dryer to be employed in the DSAD system.
Figure 3:
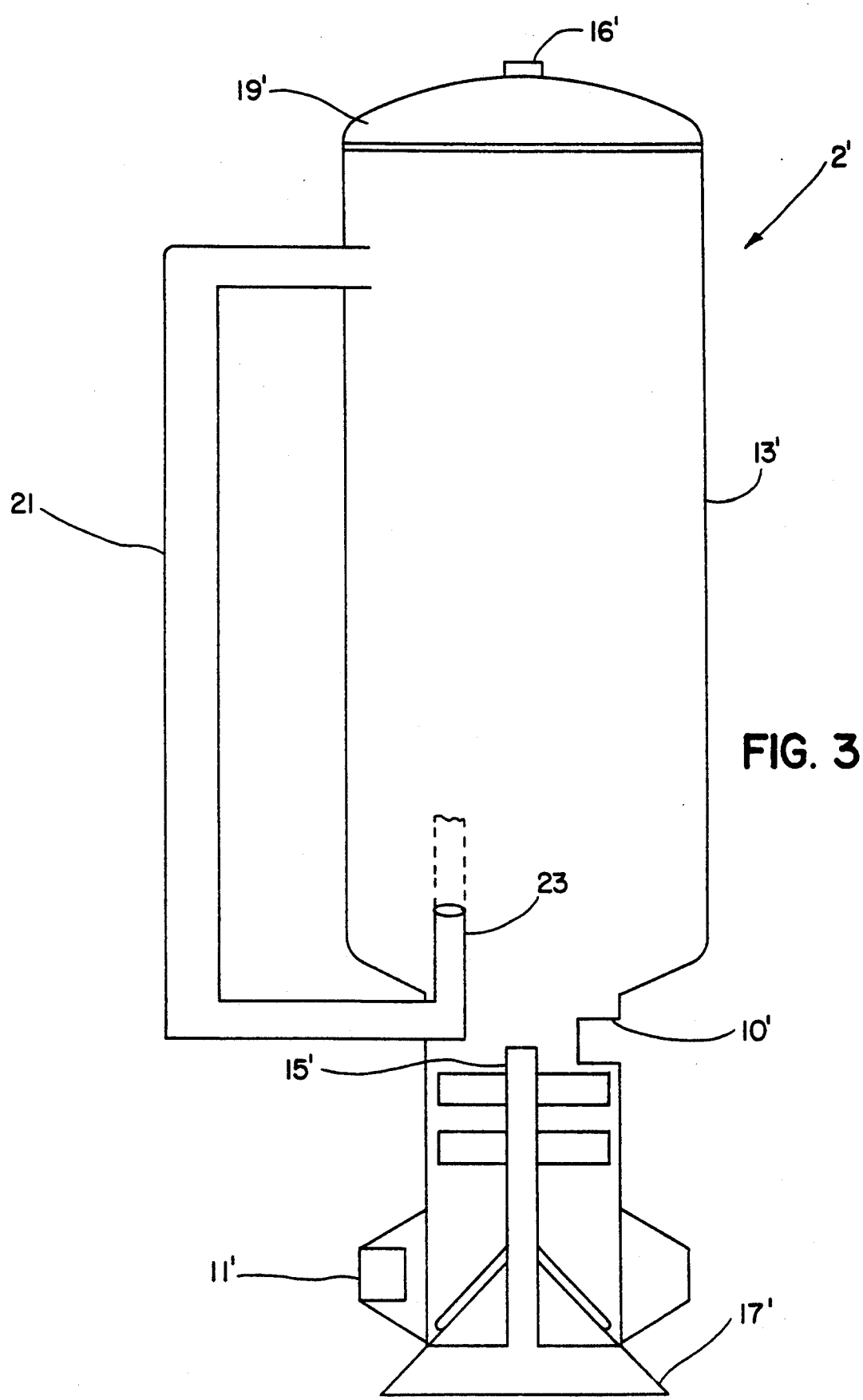
FIG. 3 illustrates an alternative dryer having an external recirculation tube which may be employed in the DSAD system.

FIG. 1 illustrates one embodiment of the drying scheme of the invention, the directly heated steam atmosphere drying system hereinafter DSAD system. Dryer 2 to be described further in FIGS. 2 and 3, is employed in combination with recompression system 4. Dryer 2 is responsible for drying wet feedstock particulate matter through the use of recirculated superheated steam. The superheated steam is circulated through the recompression system 4 via fan 6 which is powered by motor 8. Dryer 2 has inlets 10, 11 for accepting wet feed and steam from the recompression system. The wet feed may, prior to entrance into the dryer, be passed through an optional preheater 12, thereby reducing the time needed for drying in the dryer 2. Outlet 16 discharges superheated steam and dried feedstock to the curvilinear louver separator (CLS) 18, which will be described in further detail in FIGS. 4 and 5.

Dryer 2 has two internal recirculation paths. These internal recirculation paths allow superheated steam and feedstock to recirculate internally in the dryer 2 so as to effect mixing of relatively dry particles with newly introduced wet particles thereby promoting enhanced water absorption and accelerate both heat and mass transfer processes. The recirculation of feedstock particulate matter together with some portion of superheated steam, is accomplished within the dryer 2 by utilizing the pressure differences that occur naturally in the vortical flow. Through this constant recirculation, dry feedstock travels upwardly to the CLS 18 which functions to separate the dried feedstock from the superheated steam thereby allowing the dried feedstock to be collected and the superheated steam to exit the dryer 2 and travel through the recompression system 4.

The recompression system 4 is responsible for recovering liquid/water from the superheated steam emanating from the dryer 2 and converting it to a source of heat for the drying process. A portion of the superheated steam discharged from the dryer 2 is taken off and compressed in compressor 20. Compressor 20, also driven by motor 8 is shown in direct communication with the CLS 18 for receiving the steam removed from the particles that pass through it. By condensing the steam, recovery of all the water/liquid medium is possible. The compressed steam is then passed through the a heat exchanger 22, whereby it gives up its heat of compression and latent heat of evaporation. This becomes the primary source of heat for the drying process, in that the heat exchanger 22 lies in direct communication with an auxiliary heater 24 which introduces the steam to a inlet 11 of the dryer 2. However if upon introduction, the temperature of the steam is not at that temperature required for the dryer 2, the steam may recirculate through the recompression system again via dryer bypass 14, whereby its temperature would be increased through the heat exchanger 22 and auxiliary heater 24. The heat exchanger 22 communicates with expansion valve 30 for the discharge of excess condensate through the steam vent 32. An optional bag filter 26 may be located in direct communication with the CLS 18, prior to steam transmission to the compressor 20, for collecting particles that may not have been separated from the steam by the CLS 18. The bag filter 26 or bag filter bypass 28, also communicates with the steam vent 32 for discharge of excess steam.

The thermodynamic advantage of using a steam compressor can be seen as comparable to using a heat pump between a low-temperature reservoir and a higher-temperature reservoir. The coefficient of performance (COP), or heat pump efficiency, for this heat pumping action is defined as the ratio of heat delivered to the dryer recirculating steam to the work of compression required by the steam compressor. Thus, high COP's are desirable, but as will be seen, can be achieved only if low (less than 300° F.) steam dryer inlet temperatures are used.

FIG. 2 shows the structure of dryer 2 employed in the DSAD system. The dryer 2 comprises a hollow vessel 13 with an internal chamber, the vessel 13 preferably fabricated from stainless steel having a supporting base 17, and top head 19 where outlet 16 lies. Tangential inlets 10 and 11 permit the entry of wet feedstock and superheated steam into the vessel 13. Turbulator 15 causes the feedstock to mix with the superheated steam. As the mixture of steam and feedstock particulate matter travel upwardly in the vessel 13 through the recirculating flows to be described further below, part of the mixture exits through outlet 16 to enter the CLS 18 (refer to FIG. 1), while the remaining part, which still has significant water content in the feedstock, recirculates internally in the vessel with the superheated steam. This is attributed to centrifugal forces from a forced vortex, making the pressure near the dryer vessel 13 walls much higher than that in the zones along the dryer's central axis. This pressure difference is sufficient to motivate intensive recirculation. The recirculating particles are driven to the periphery by the centrifugal forces, and relatively heavy particles which are basically wet and agglomerated particulate matter introduced from tangential inlet line will reach the dryer walls, while allowing some light and dry particles to escape from the CLS 18. In this regard the dryer works also as a classifier. This selective separation of the particles improves the quality of drying.

FIG. 3 shows another dryer 2' which may be employed in the DSAD system. The dryer 2' has a hollow vessel 13' preferably of stainless steel having a supporting base 17', and top head 19' where outlet 16' lies. Tangential inlets 10' and 11' permit the entry of wet feedstock and superheated steam into the vessel 13'. Turbulator 15' causes the feedstock to mix with the superheated steam. As the mixture of steam and feedstock particulate matter travel upwardly in the vessel through the recirculating flows to be described further below, the mixture exits through outlet 16' to enter the CLS 18' (refer to FIG. 1), while the remaining part recirculates internally in the vessel and externally in recirculation line 21 with the superheated steam. The purpose of recirculation line 21 is to provide additional recirculation for mixing the superheated steam with the feedstock thereby promoting water absorption and accelerated heat and mass transfer processes. The length of the internal part 23 of the recirculation line 21 is important in that the length directly determines the particle retention capability of the drying vessel 13'. It is necessary to be able to meter the throughput in such a way that the flow of material in the vessel 13' is equal to that leaving so there is no net build-up in the system. A way of accomplishing this is by altering the length of the internal recirculation tube 23 to effect collection or recirculation efficiency to any desired value. The length also directly effects what density material will circulate efficiently within the chamber thus making the chamber adjustable for most small particles.

The operation of this dryer is as follows; the particles entering the dryer from the recirculation line 21 are pulled to the wall of the vessel 13' by a centrifugal force. Particles leave the chamber by inertia forces. When the internal recirculation tube 23 is shortened, the length of time for the centrifugal force to effect the inertia force is increased thus allowing the particulate matter to be recirculated. When the internal recirculation tube 23 is lengthened the centrifugal force has less time to effect the inertia force thus allowing the particulate matter to leave sooner.

Figure 4:
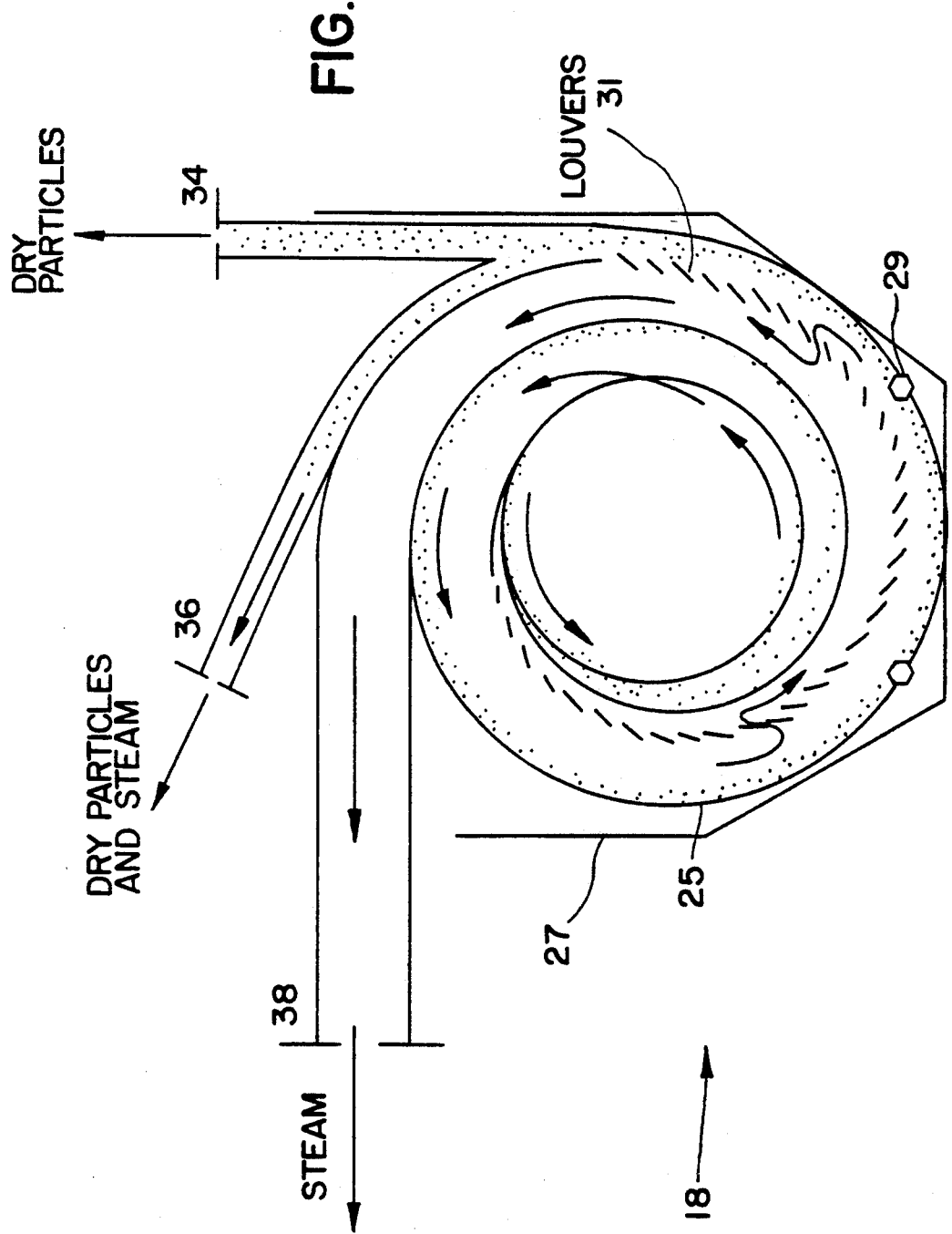
FIG. 4 is a top view of the curvilinear louver separator (CLS) used in the DSAD system.

FIG. 4 shows a top view of the CLS 18 which is responsible for separation of the dry feedstock particulate matter from the superheated steam that has traveled through the dryer 2. What is shown as a spiral structure with a circular opening is an axially curved stainless steel member 25 which forms the body of the CLS. A top plate 27 attached by bolts 29 covers the system, thereby preventing matter from flying outward. Mounted between member 25 and top plate 27 are spaces louvers 31. The angle of inclination for each louver 31 may be adjusted in order to effect particle removal efficiencies, according to the needs of the user. The louvers 31 are essentially blade-like members comprised of stainless steel sheet metal. Passages 34, 36, 38 permit superheated steam, dry feedstock and a combination of the two to exit the CLS.

Figure 5:
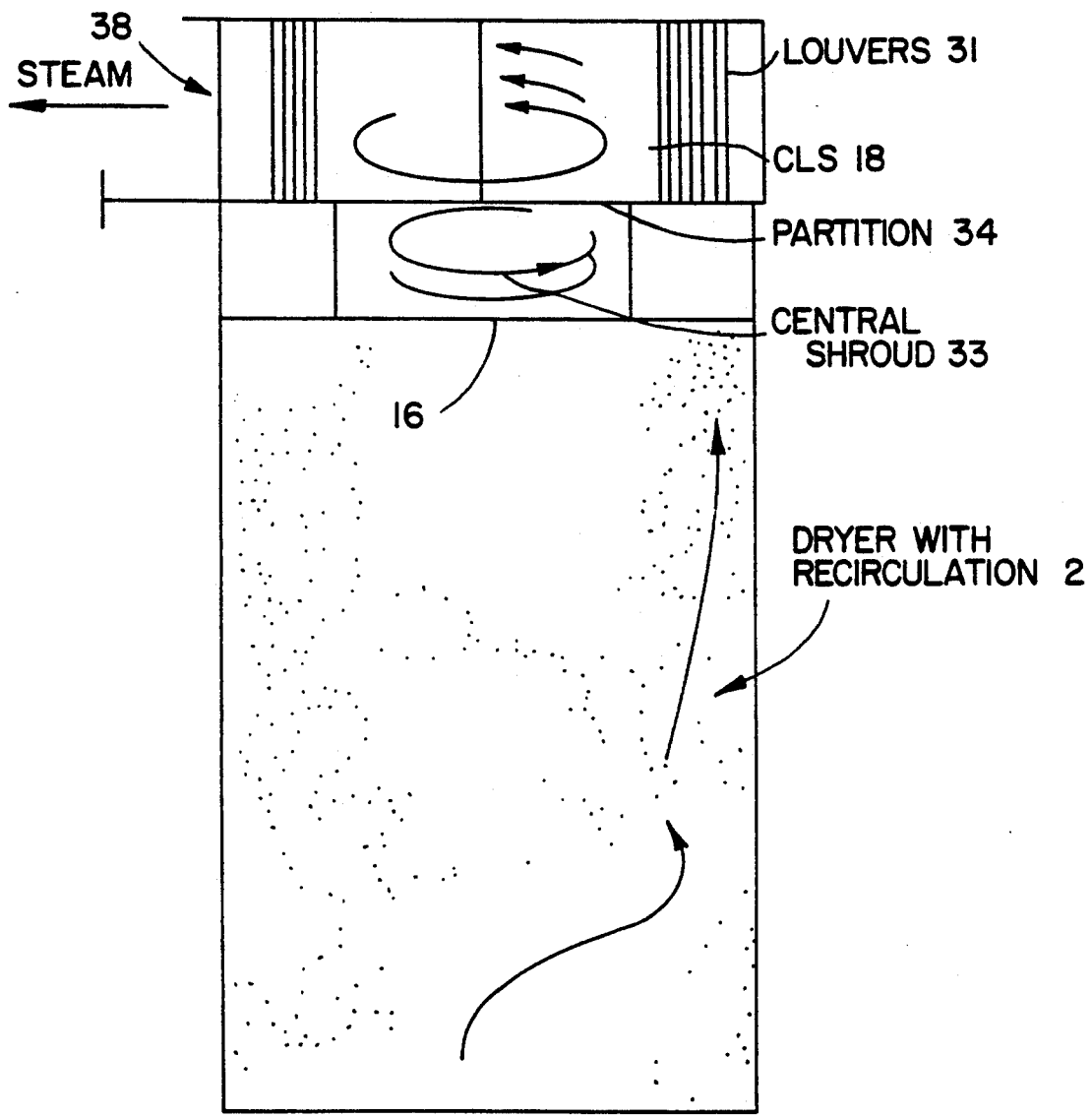
FIG. 5 shows a sectional view of the CLS in combination with the dryer.

FIG. 5 shows a sectional view of the CLS 18, after the dry particulate matter and steam travels through the outlet 16 of the dryer 2 it becomes discharged into central shroud 33. From here it travels through partition 34 whereby the dry particulate matter and steam are separated. In operation, a particle laden air stream enters the CLS 18 from the bottom, through the central shroud 33 and then the through partition 34, which causes the stream to spiral radially outward. The particle laden air stream turns sharply around the louvers 31 acting like blades and inertial and centrifugal forces separate the solid dry particulate matter from the superheated steam. Thus, the particles are centrifugally and inertially forced to spiral along the outer edge of partition 34 while most of the air stream is passed through the louvers 29 and allowed to escape the CLS through the passages 34, 36, 38. This separation of particulate matter from superheated steam results in dry particles traveling via outlet conduit for collection 34, dry particles and steam traveling to optional bag filter 14 via outlet conduit 36, and steam traveling to compressor or steam vent via outlet conduit 38.

The effect of steam/particulate matter separation is coupled with the effect of separation due to turning the main flow. A single louver separator usually has a 3 to 5 times lower pressure drop coefficient and 20 to 40 times smaller internal volume than a single cyclone. The CLS 18 may improve the particle collection efficiencies of larger, coarser particulate matter as well. Relatively coarse particles may be separated in the curvilinear duct without even touching the louvers. Additionally the CLS 18 allows for the use of higher flow velocities in the CLS 18 duct without excessive erosion of the louvers or without comparable higher air pressure drops.

Figure 6:
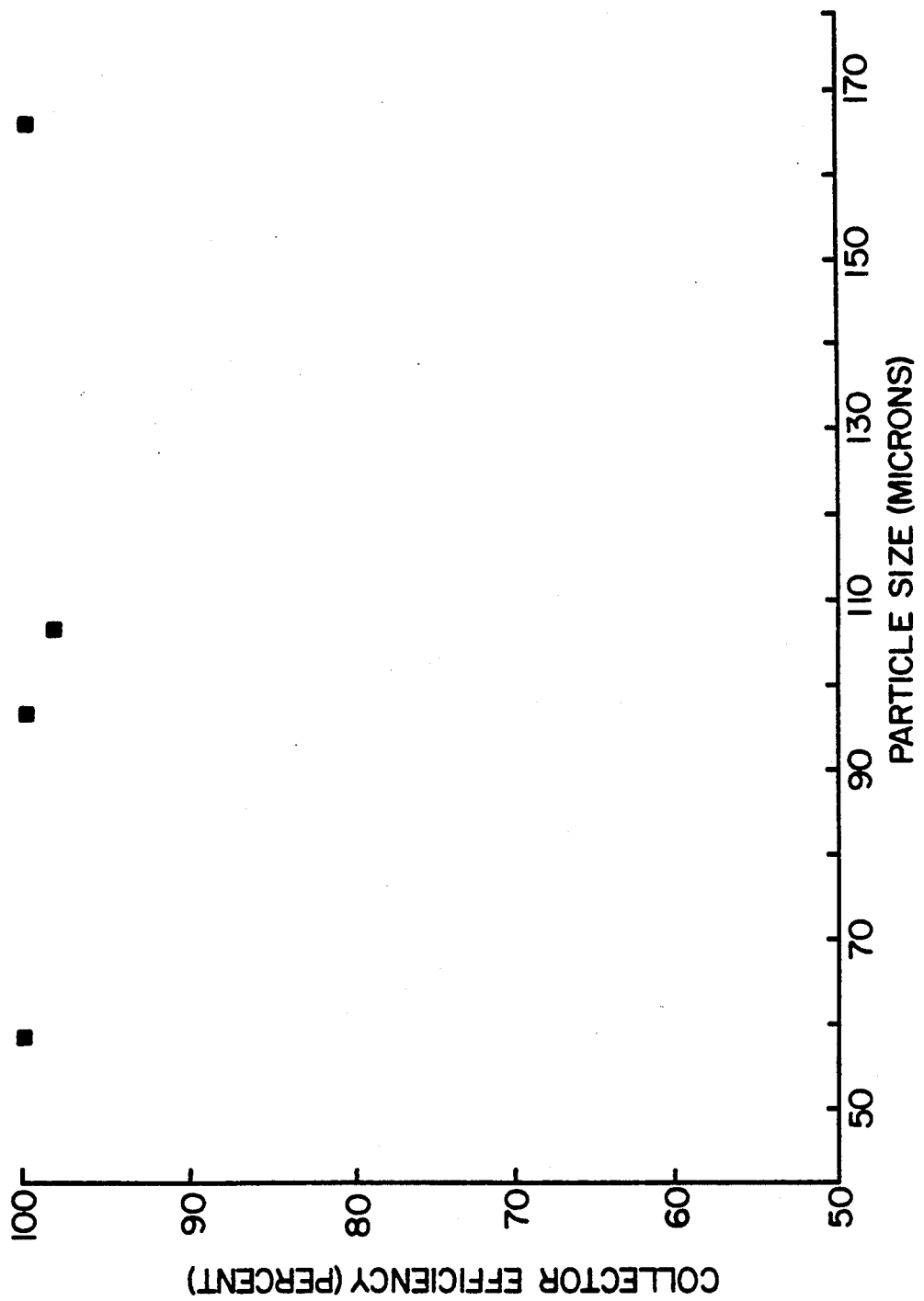
FIG. 6 is a graph demonstrating the results of the cold test performance on the CLS.

The CLS 18 has been mathematically modeled to discern these benefits but more significantly, a cold-test flow model was constructed and tested to verify this mathematical modeling, as shown in FIG. 6. It was assembled to perform a variety of particle flow tests while enabling visual observation of the particle-air flow regimes, by constructing it of clear Plexiglas. The particle concentration in the CLS 18 was controlled by varying particle feed rates from a feed tube. For testing, a plexiglas CLS 18 was secured to the top of the cyclone vessel. Air was forced through the cyclone vessel, entraining the particles before it passed through the CLS 18. The three discharge passages 34,36,38 of the CLS, one for steam 38 and the other for particle-air 36, and the other for particles 34 were covered by fabric filter bags to collect particles discharged from each port. The weight of these captured particles was then used to determine the CLS collection efficiency. The results of the testing with the CLS model using four sizes of particles are displayed in FIG. 6. The small CLS had a collection efficiency that varied from 97 to 99% using particle sizes of 60 to 170 microns. The air stream pressure drop was approximately 1-2 inches in water with air flowrates of 300 scfm. This testing demonstrates the effectiveness of the CLS 18 to separate fine size particles.

Figure 7:
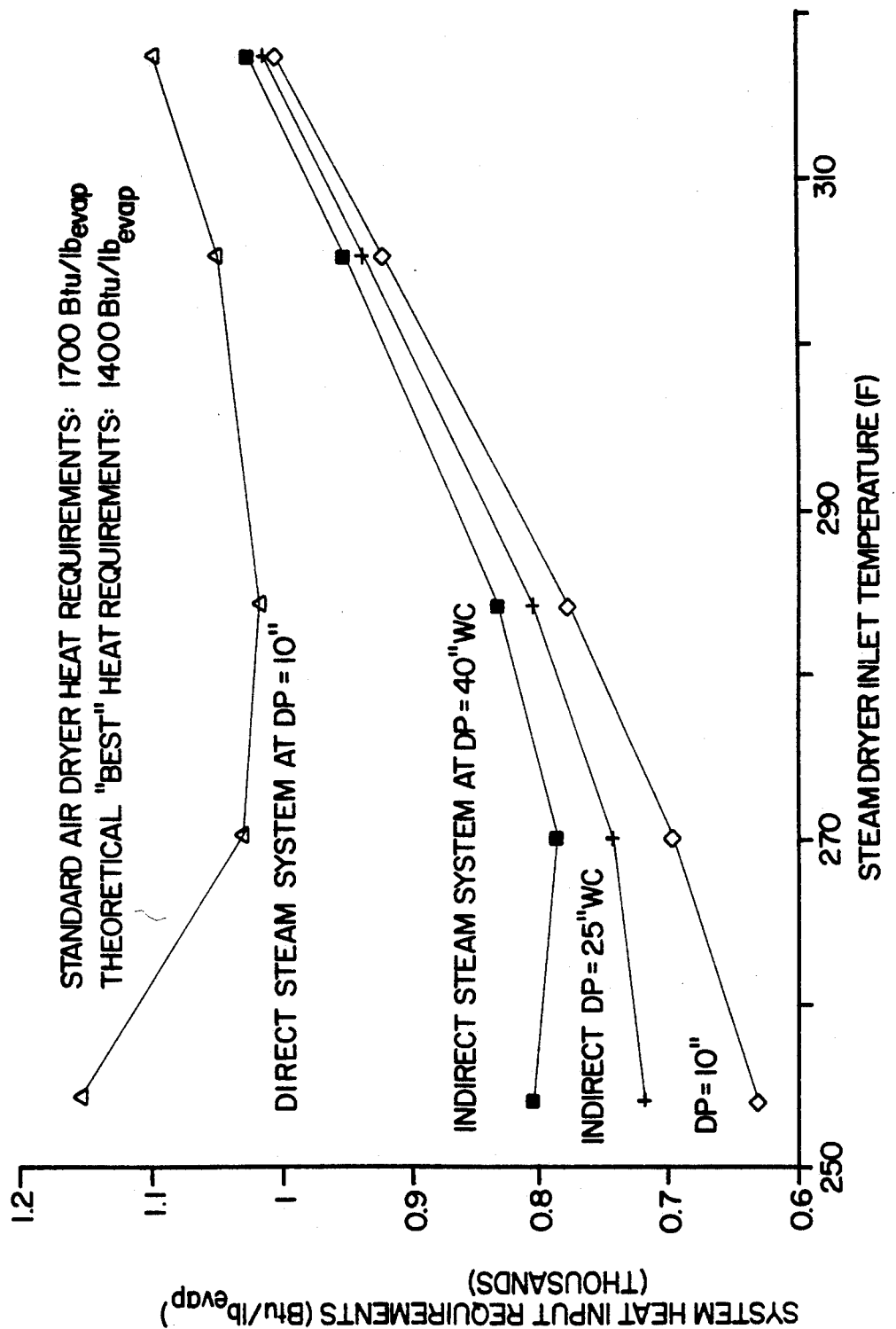
FIG. 7 illustrates steam dryer performance of the DSAD system and the ISAD system for various system pressure drops.

The performance of the DSAD system is summarized in FIG. 7. The minimum heat requirements can be observed to be 1015 Btu/lb evap at approximately 275° to 280° F. dryer inlet temperatures. This optimum performance state point requires no additional heat input from the auxiliary heater. The energy savings between this state point and the comparable air-dryer operating condition is approximately 40 percent at an air-dryer stack temperature of 150° F. and approximately 85 percent at an air-dryer stack temperature of 500° F., assuming air recirculation ratio equals zero and the humidity equals 0.4. Clearly this is a substantial performance improvement.

In order to achieve the locus of state points shown in FIG. 7, the steam compressor pressure ratio was varied until no auxiliary heat input was required to attain the dryer inlet temperature shown. The steam compressor 20 pressure ratio and hence, the steam recompression system's 4 coefficient of performance (COP) can consequently be observed to change as the desired dryer steam inlet temperature increases from 240° F. to 350° F. Although there is a clear minimum heat requirement identified in FIG. 7, the performance of the steam dryer cycle at the low dryer inlet temperatures requires that a large amount of recirculated steam flow rate be maintained through the dryer 2. Consequently, the fan 6 power requirements for the steam cycle are significant and are comparable to those of the steam compressor 20. For example, at the 275° F., minimum state-point operating condition, the fan 6 and steam compressor 20 would each require a 180 kW electric motor drive for 5000 lbs of evaporation duty.

The volume of steam flowing through the dryer 2 is found to be very high at dryer inlet temperatures below 400° F. when compared with the flow rate of air in standard air dryers. This implies that the size of the dryer system piping and components would need to be made larger if equivalent pressure drops were to be maintained. It is important therefore to design the dryer system with lower volume flow rates, for example by reducing steam recirculation ratio. The steam recirculation ratio can be decreased by increasing the steam dryer inlet temperature. However, the steam compressor pressure ratio must be increased with a subsequent reduction in the steam compressor's COP. Thus, although an increase in dryer inlet temperature results in a decrease in the recirculation rate, the use of auxiliary heat input from a fuel-fired steam heater would be required. This results in an increase in the amount of heat required to evaporate one pound of water from the feedstock.

Figure 8:
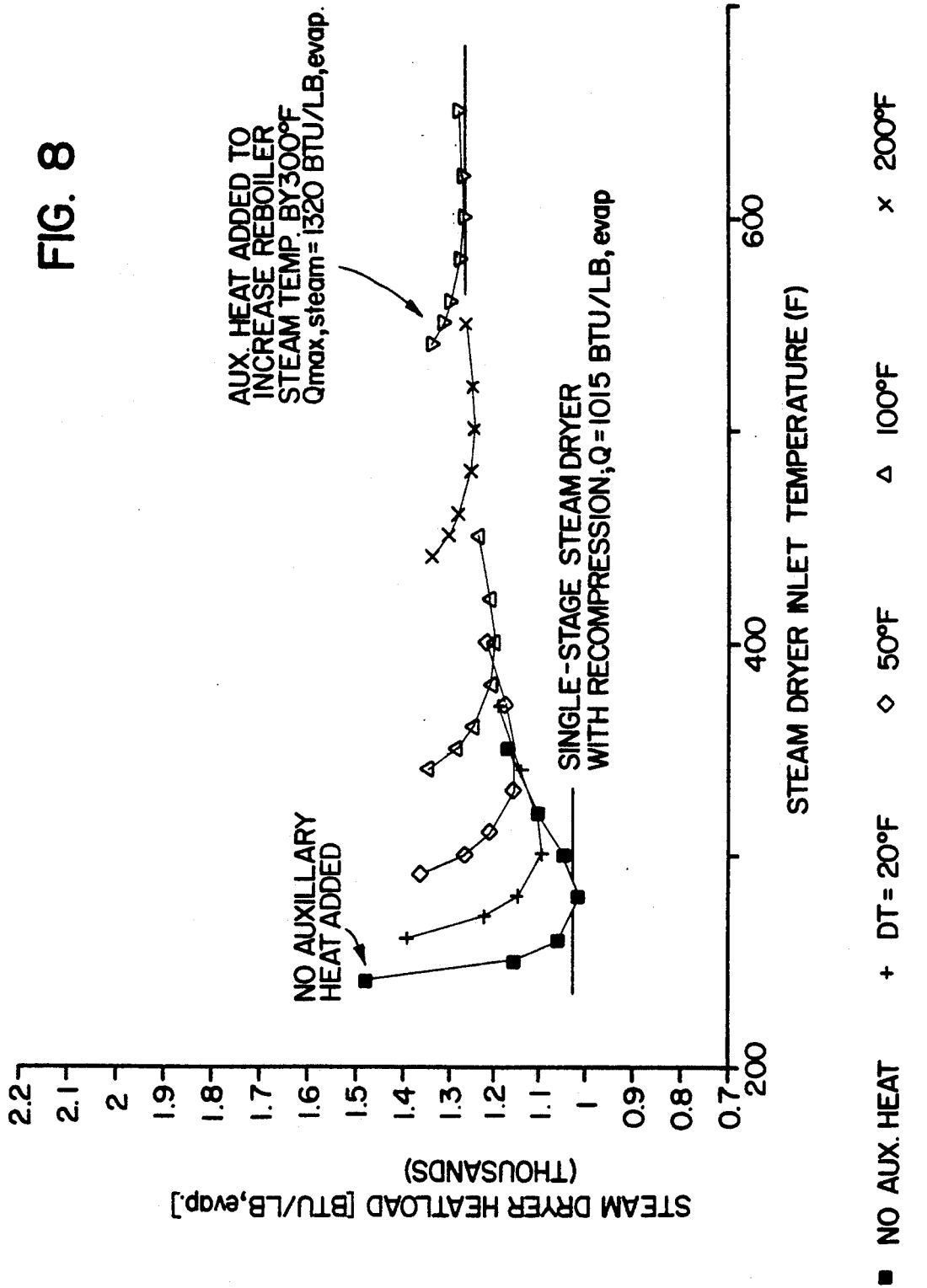
FIG. 8 is a graph showing the effect of auxiliary heat input on a single stage DSAD system.

In the event that higher steam inlet dryer temperatures are desired and auxiliary heat input 24 is used to increase the steam temperatures exiting the heat exchanger 22, the use of steam as the drying medium still provides an advantage over the conventional air-dryer system in that a maximum heat input limit is reached that is still 7 to 42 percent lower in energy requirements than the best air-based dryer performance. For example, as shown in FIG. 8, the need for higher steam dryer inlet temperatures results in the locus of state points to equilibrate to a steady state and maximum heat input of approximately 1320 Btu/lb evap as auxiliary heat input to the steam is increased. Shown in FIG. 8 are six curves, each is the locus of state points originally displayed in FIG. 3. However, now each curve displays an increase of superheated steam temperature of 20° F., 50° F., 100° F., 200° F. and 300° F. greater than the original optimum steam cycle reboiler discharge temperatures shown in FIG. 7. The effect observed in FIG. 8 is the transition from a system that has 100 percent of the dryer recirculation steam heated with a steam heat pump to one that has 90 to 95 percent of its heating derived from the auxiliary heating 24 system. For such a system, the fan 6 and steam compressor 20 power requirements are considerably lower, requiring as little as 30 kW for the fan 6 and steam compressor 20 for 5000 pounds of evaporation duty.

It may be noted, therefore, that two distinct regimes of dryer operation can now be discerned: steam dryer temperatures above and below 450° F. For heat-sensitive feedstock materials that typically require 450° F. or cooler dryer inlet temperatures, a steam recompression system 4 is clearly beneficial and is recommended. For less heat-sensitive feedstock materials that typically can tolerate higher inlet dryer temperatures, for example above 450° F., a steam recompression system is less desirable and perhaps should not be included as part of the steam atmosphere recompression industrial dryer system. In each instance, however the use of a steam atmosphere dryer 2 is still more efficient than the comparable air-based dryer. For the state points described here, an average energy reduction of 25 percent is still attainable at dryer inlet temperatures of 650° F.

Figure 9:
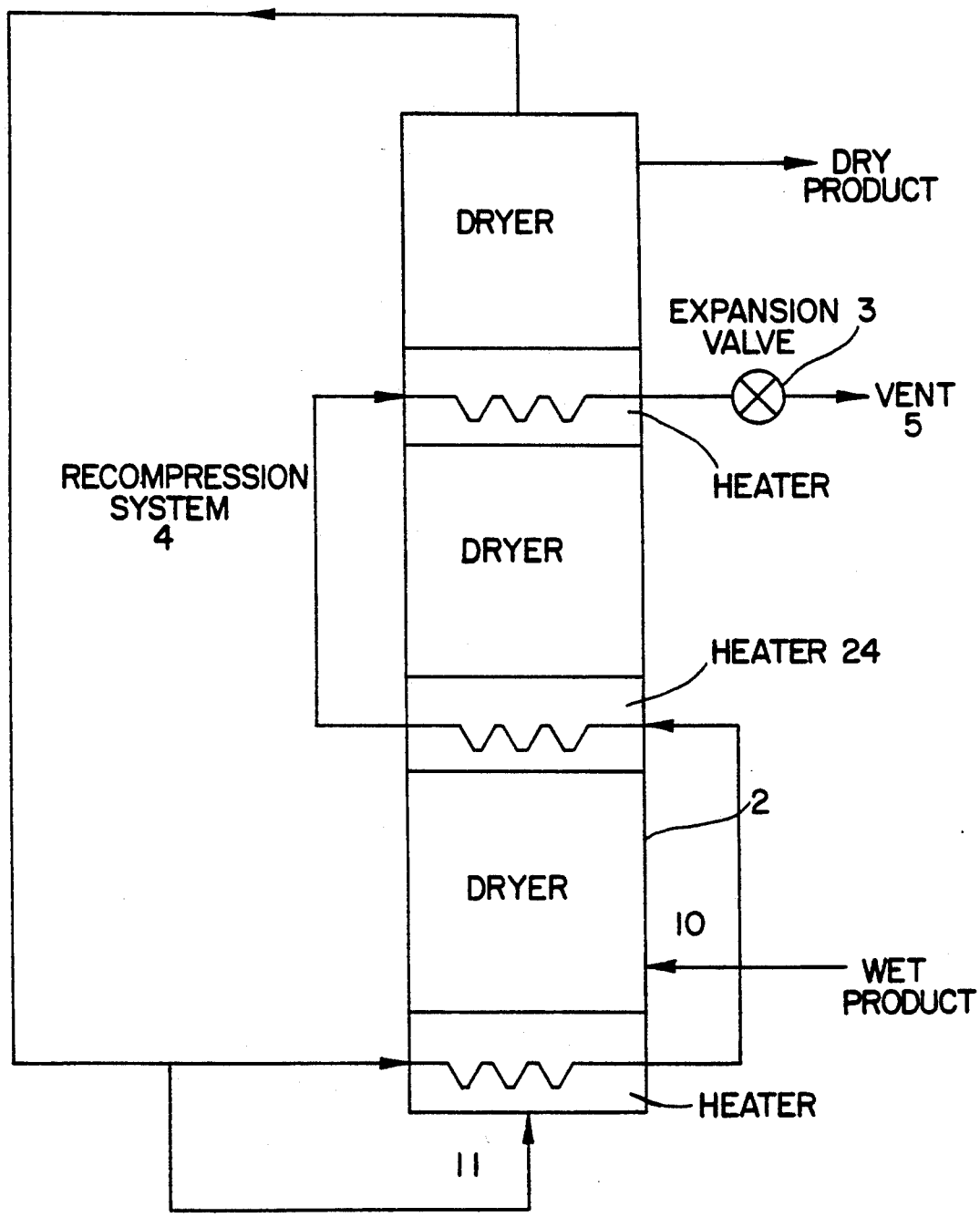
FIG. 9 illustrates a staged DSAD system.

Another means of reducing the recirculation rate and thus reducing the fan 6 power requirements is available by employing a staged dryer system, the second embodiment of the invention as shown in FIG. 9. This figure is essentially the same as FIG. 1 except shown is the use of three dryers 2 whereby three heaters 24 are spaced therebetween. The heaters 24 communicate with eachother and serve to dry the feedstock by the steam without the need for a great recirculation rate. Expansion valve 3 allows excess steam to exit via vent 5.

Figure 10:
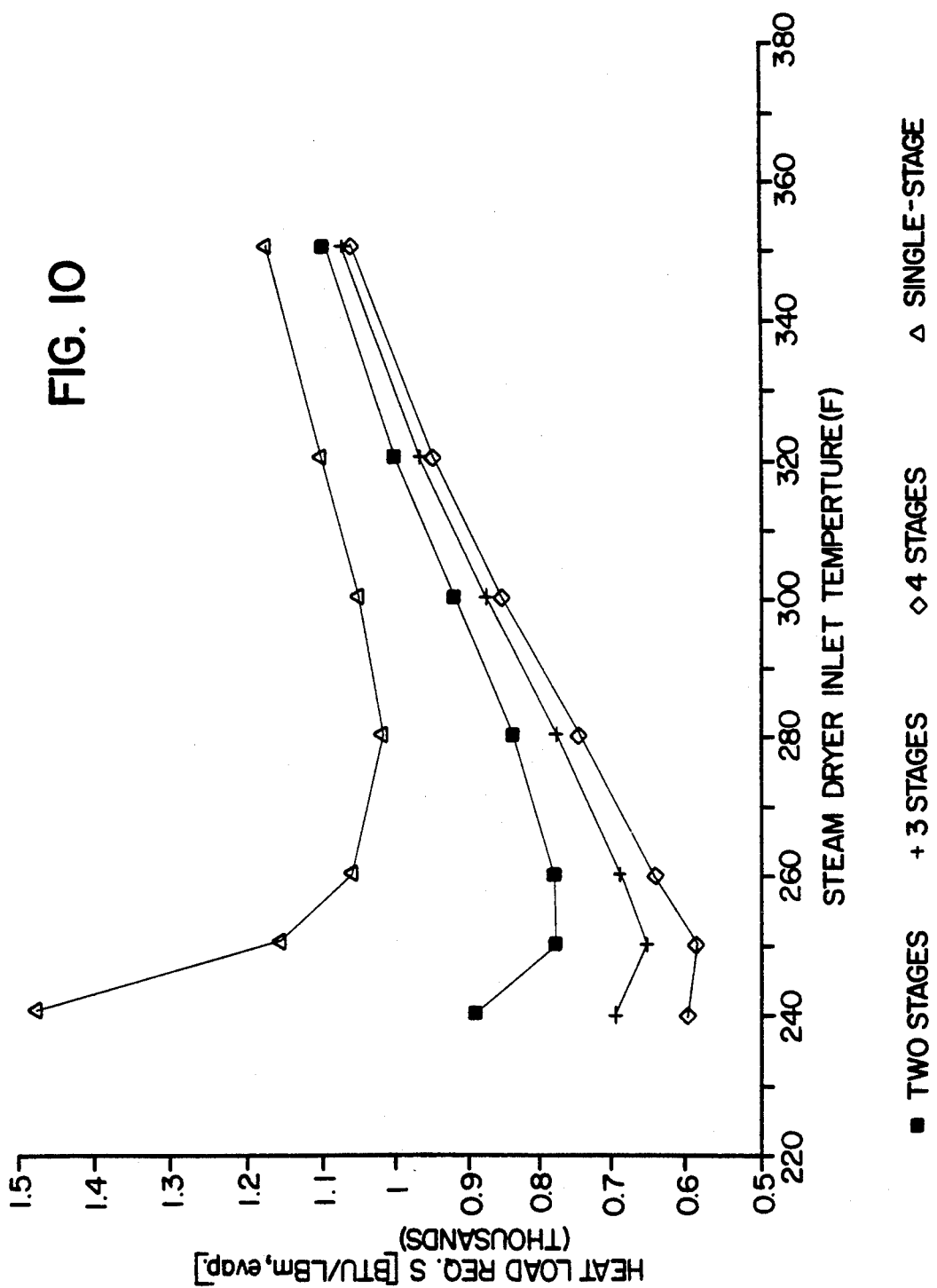
FIG. 10 illustrates the optimum steam dryer cycle performance with staged (DSAD) system.

The effect of using up to four stages of steam dryer heating is shown in FIG. 10. The benefit of a staged system is apparent, reducing the steam dryer heat input from 1015 Btu/lb evap in a single-stage dryer to 600 Btu/lb evap in a four-stage dryer. As can be observed in FIG. 10, the incremental benefit of using a staged heating process is significant for the second and perhaps third stages. However, the incremental energy saving for more than three stages probably will not outweigh the cost for the added dryer system complexity.

Figure 11:
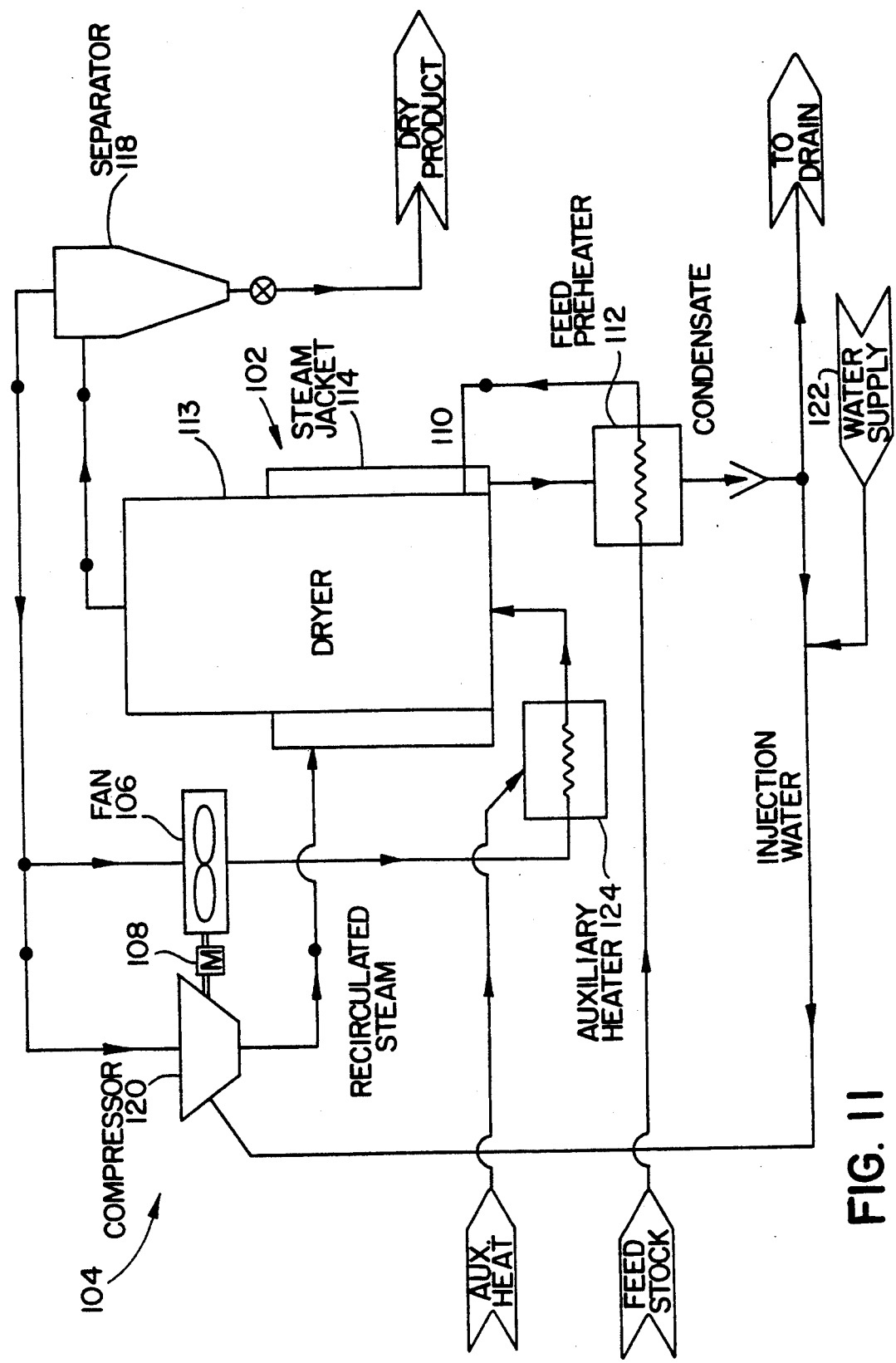
FIG. 11 illustrates an indirectly heated steam atmosphere drying (ISAD) system.

The second embodiment of the invention is disclosed in FIG. 11 whereby shown is an indirect steam atmosphere dryer system with steam recompression, hereinafter ISAD system. This system contains similarities to the DSAD system of FIG. 1, however the dryer 102 is constructed so as to provide means for indirect heating of the feedstock as well as direct heating of the feedstock. In this embodiment the steam fan power is reduced. In this system, drying of feedstock is produced by conduction heat transfer from the dryer's steam-heated jacket 114 in addition to convection drying from the recirculated or transport steam medium.

Dryer 102 is employed in combination with recompression system 104 and like the embodiment of FIG. 1, is responsible for drying wet feedstock particulate matter through the use of recirculated superheated steam. The superheated steam is circulated through the use of a fan 106, powered by motor 108. Dryer 102 is shown as having an inlet line 110 whereby wet feedstock which has been heated by feed preheater 112, may enter. Feed preheater 112, an optional feature, reduces the energy requirements by recovering heat from the steam condensate before it leaves the system. The dryer is preferably a vessel 113 comprised of stainless steel, whereby a steam jacket 114, depicted in further detail in FIG. 12, surrounds a portion thereof. By jacketing the drying vessel 113, high pressure steam from compressor traveling therein, can be condensed on the wall of vessel 113.

Compressor 120 provides high pressure steam to the steam jacket 114 by transporting a portion of the condensate from the steam jacket 114 and injection water from the water supply 122 to the compressor 120 which recirculates the steam back to the steam jacket 114. Since the flowrate of steam to the drying vessel 113 is reduced, the size of the vessel 113 can be reduced in comparison to the vessel 13 of FIGS. 2 and 3. Thus, this system is very energy efficient.

In operation, wet feedstock travels through the feed preheater 112 and then through inlet of the vessel 110 where it is met by recirculating superheated steam at inlet 111. Thus, the feedstock is directly heated by the superheated steam it mixes with, via steam introduction at inlet 111. The feedstock is then indirectly heated by the condensate formed on wall of the vessel 113. The feedstock and steam are then circulated in the vessel 113 whereby separation of dry feedstock from the steam is carried out through the separator 118 which could be the CLS disclosed in FIGS. 4 and 5 above or a conventional cyclone separator. The ISAD system differs from DSAD system of FIG. 1 in that the steam that passes through the compressor 120 of the ISAD system in FIG. 11 does not then pass through a heat exchanger to transport steam to the internal part of the vessel. Instead the output of the compressor 120 instead goes directly to the steam jacket 114 which indirectly heats the vessel 113. The remaining portion of steam that travels through the fan 106 will pass through the auxiliary heater 124 and then be reintroduced to the inside of the dryer 102. Thus, the feedstock drying is produced by conduction heat transfer from the steam jacket 114 to the dryer 102 in addition to convection drying from the recirculated steam transported to the dryer 102.

Figure 12:
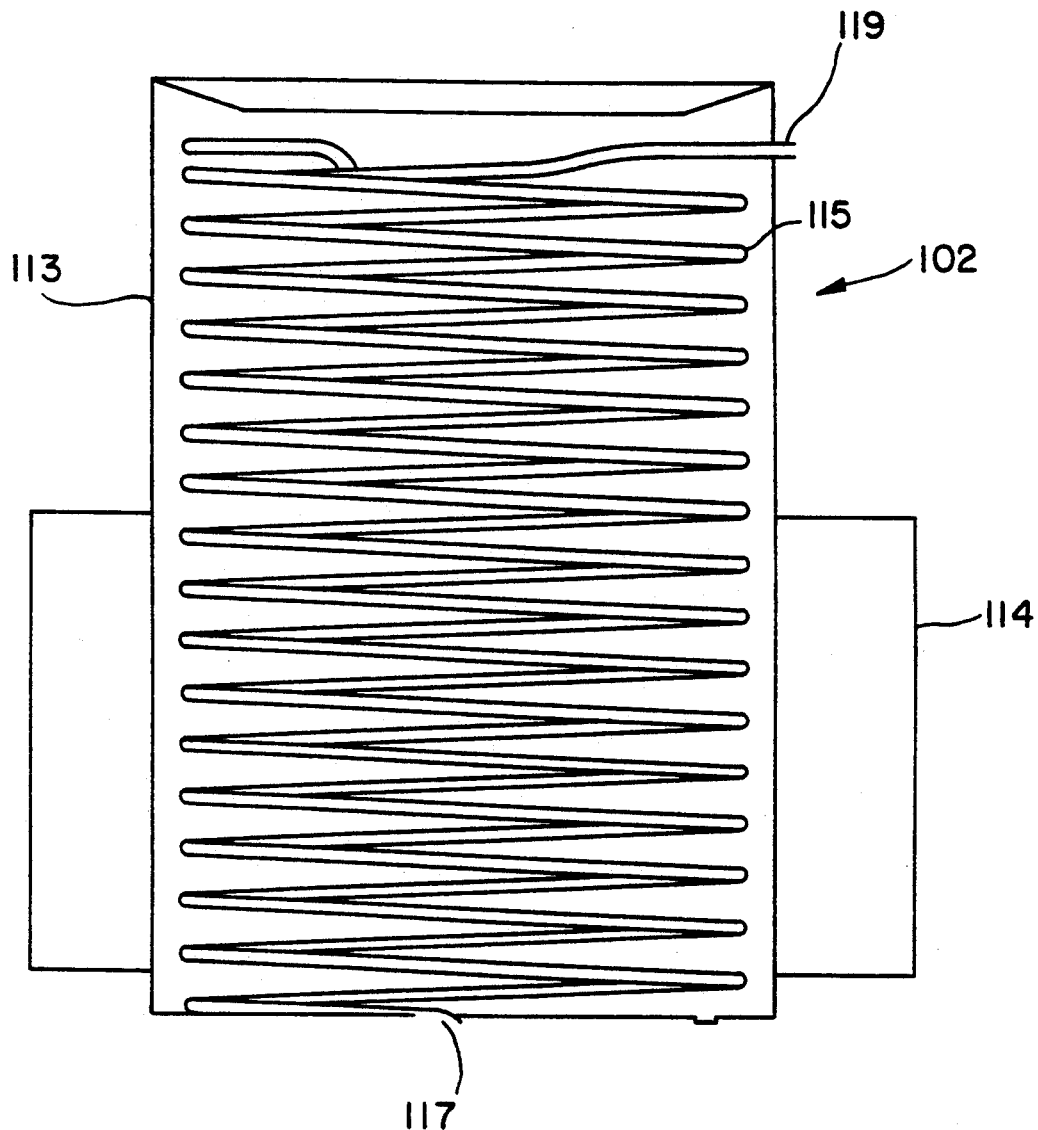
FIG. 12 illustrates a dryer employed in the ISAD system.

FIG. 12 shows the body of the dryer 102 which carries out this indirect method of heating. The basic structure of the dryer employed in the ISAD system is substantially the same as that shown in FIGS. 3 and 4, with following internal modifications made thereto. Internally contained within the dryer 102 of the ISAD system is stainless steel helically coiled tubing circuit 115. The tubing has inlet lines for accepting the steam 117 from the fan 106 and outlet lines 119 for discharging it. Steam travels through the coiled tubing 115 which dries the feedstock traveling through the dryer 102. Also shown in this figure is steam jacket 114 encasing the dryer, to be described in further detail in FIG. 14.

Figure 13:
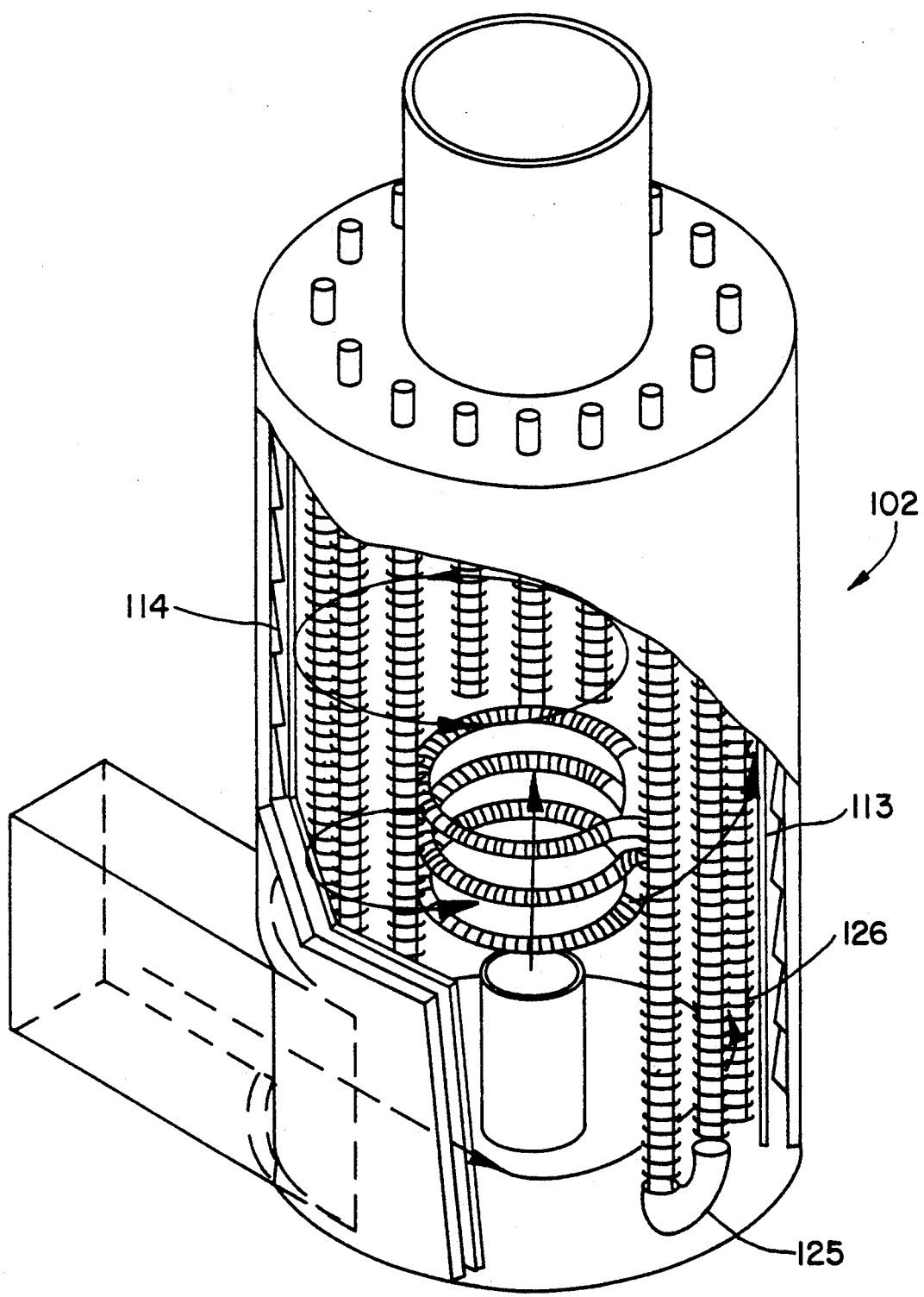
FIG. 13 illustrates an alternate dryer employed in the ISAD system.

FIG. 13 shows a similar helical tubing circuit 125 which lies in the internal body of the dryer 102 which also provides a means for steam to flow from the fan 106 to internal body of the dryer 102. This tubing circuit 125, however, has stainless steel fins 126 emanating from the tubing so as to increase the surface area and thus provide enhanced heat transfer and thus aid in the drying of the feedstock. Also shown in this figure is steam jacket 114 encasing the dryer, to be described in further detail in FIG. 14.

Figure 14:
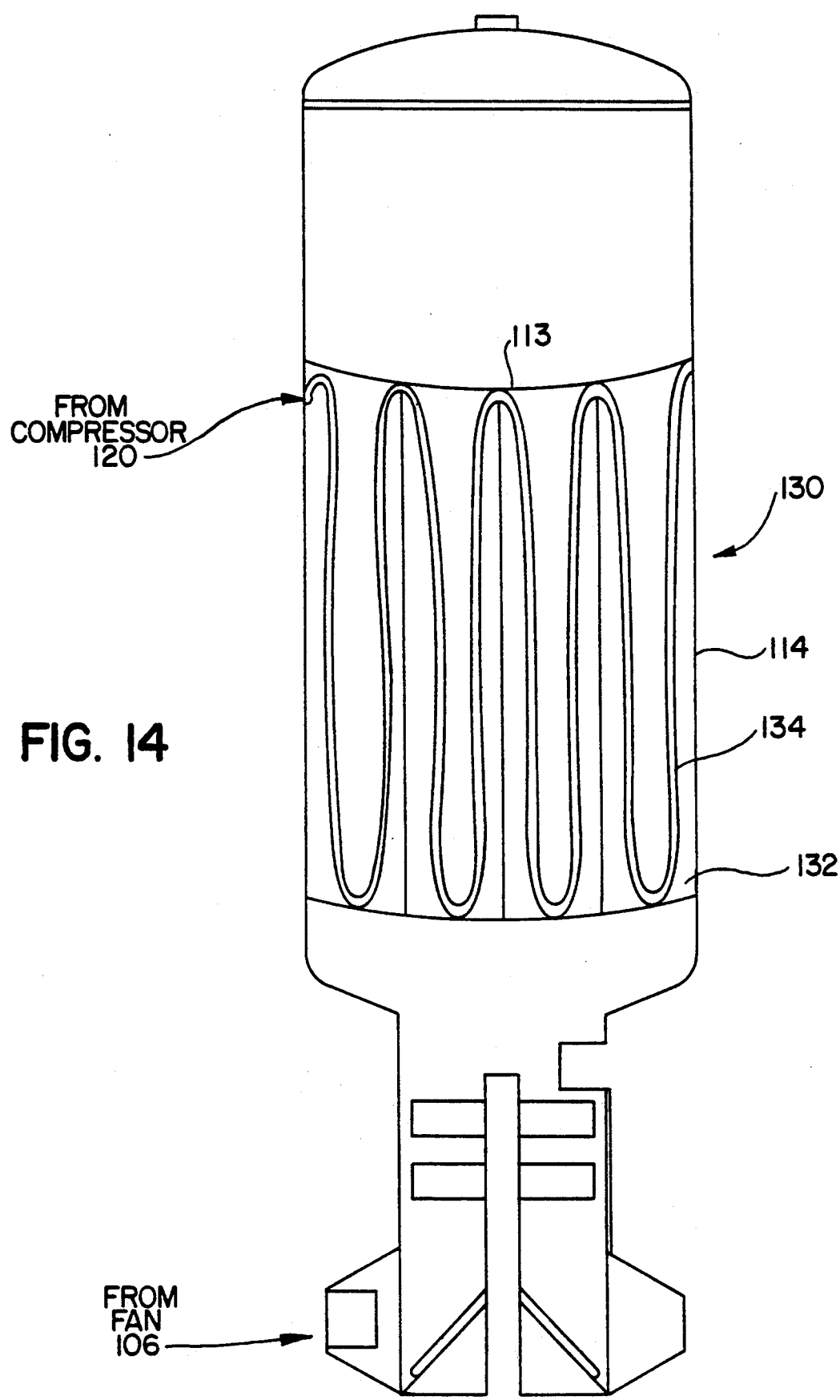
FIG. 14 illustrates the external jacket of the dryer employed in the ISAD system.

Shown in FIG. 14 is the steam jacket 114 encasing the vessel 113 of the dryer 102. Several plate coils 130 comprised of stainless steel are mounted on the outside of the vessel 113. The plate coils are plates 132 having mounted thereon, hollow stainless steel tubes 134 in a helical configuration whereby steam is passed therethrough from compressor 120. As the steam passes through the tubes, condensation forms on the inside of the vessel 113. The feedstock in the vessel 113 is then dried as the steam flowing across the indirect heating surface, that being the steam jacket 114, gives up its heat to the feedstock. The net result is a reduction in the amount of steam that must be recirculated to dry the same quantity of feedstock.

A thermodynamic analysis of the ISAD system reveals that the very low recirculation steam flow rate requirements cause this system to be less sensitive to the fan 6 power parasitic, which is essentially the net loss of energy due to the power consumed by the fan 6. In fact, the very low recirculation flow rate allows the overall system pressure drop to increase without critically increasing the power required for the fan 6. Going back to FIG. 7, the heat input requirements for the ISAD system are displayed for comparison with the previously quoted performance of the DSAD system. Thus, it can be observed that the heat input requirement for an ISAD, in this instance, one which uses a steam jacket 114, with a 40-in. system pressure drop results in a 20 percent decrease in heat requirements when compared with the direct steam atmosphere dryer with a 10-in. overall system pressure drop.

Figure 16:
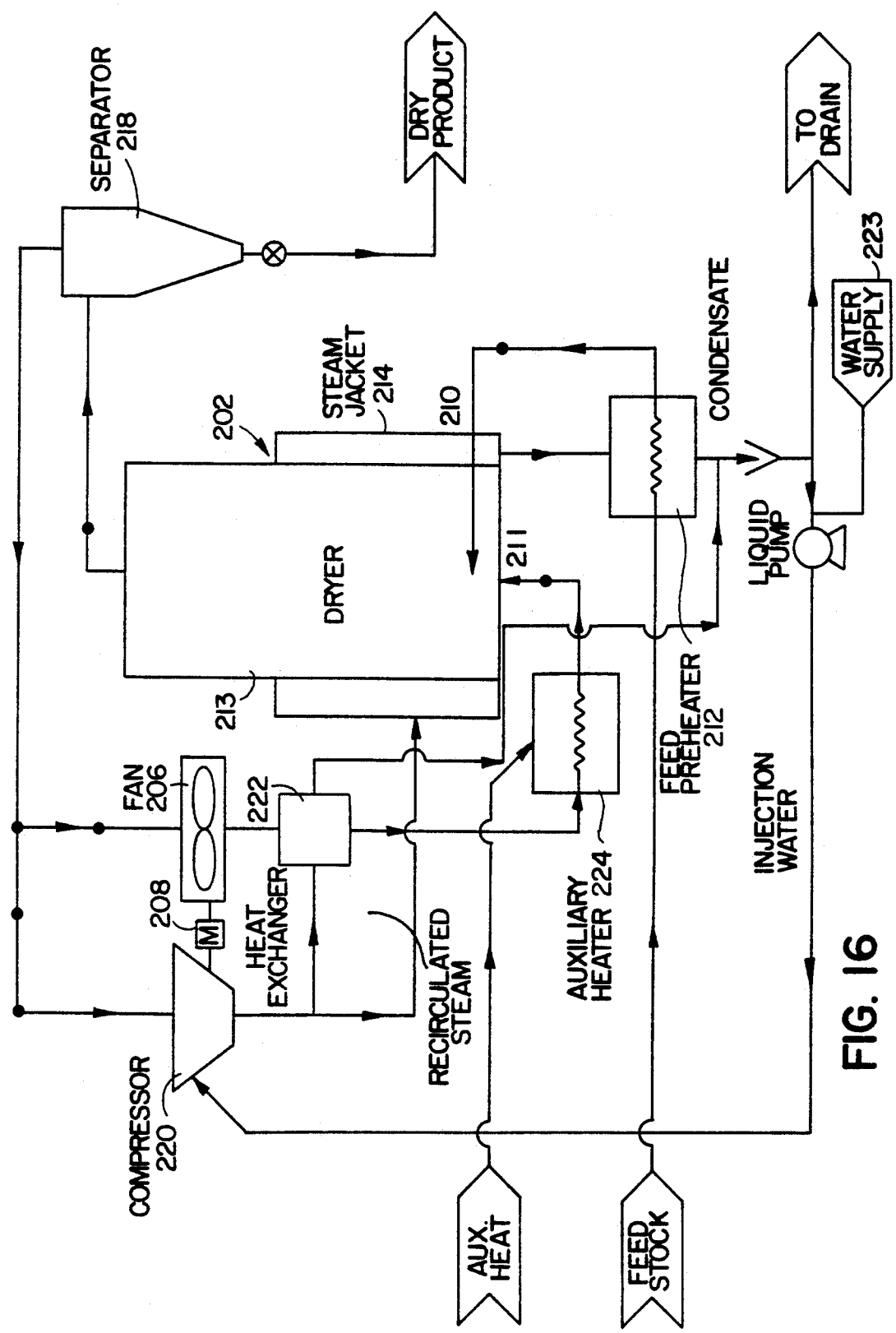
FIG. 16 illustrates the advanced heated steam dryer system (ASAD), which features both directly heated steam and indirectly heated steam concepts.

The top curve in FIG. 7 is for the DSAD system representing all heat transferral being direct. The lower curve is for an ISAD system whereby all the heat from the heat pump loop is transferred indirectly and the heat required for both systems to bring the dryer inlet temperature to the level shown is provided by each system's auxiliary heater 24, 124. The pressure drop through the drying vessel 13, 113 is the same in both cases. Since the flow through the recirculation fan 106 of the ISAD system is greatly reduced with the same pressure rise across the fan 106, the fan power is reduced accordingly. At the same dryer inlet steam temperature, the power to the compressor 120 is unchanged since the compressor flow and pressure rise are unchanged. While this figure illustrates the maximum impact that could be obtained theoretically by using indirect heating, a practical system would use a combination of direct and indirect heating, thus a combination of the DSAD system and the ISAD system as shown in FIG. 16.

The low recirculation rate is a net result of providing most of the dryer's 102 heat requirements via conduction heat transfer between the dryer's jacketed wall 114 and the feedstock's water laden particles. The amount of heat required to preheat, vaporize, and superheat the water entrained in the feedstock is fixed at approximately 1120 Btu/lb evap whether the heating is to be done with the DSAD or the ISAD system. If a large portion of this heating is available via conduction then less heat will be needed from the superheated transport steam medium. If less heat is required from the transport steam its flow rate through the dryer can be reduced.

The net result is a decrease in the recirculation flow rate ratio and thus a decrease in the impact of the system's pressure drop on fan parasitics.

The thermodynamic analysis conducted for the ISAD revealed that 90 percent of the heating requirements of the feedstock can be met by the steam compressor's steam output. The direct consequence of this is a drastic reduction in the dryer's recirculation ration when compared with a DSAD system.

Figure 15:
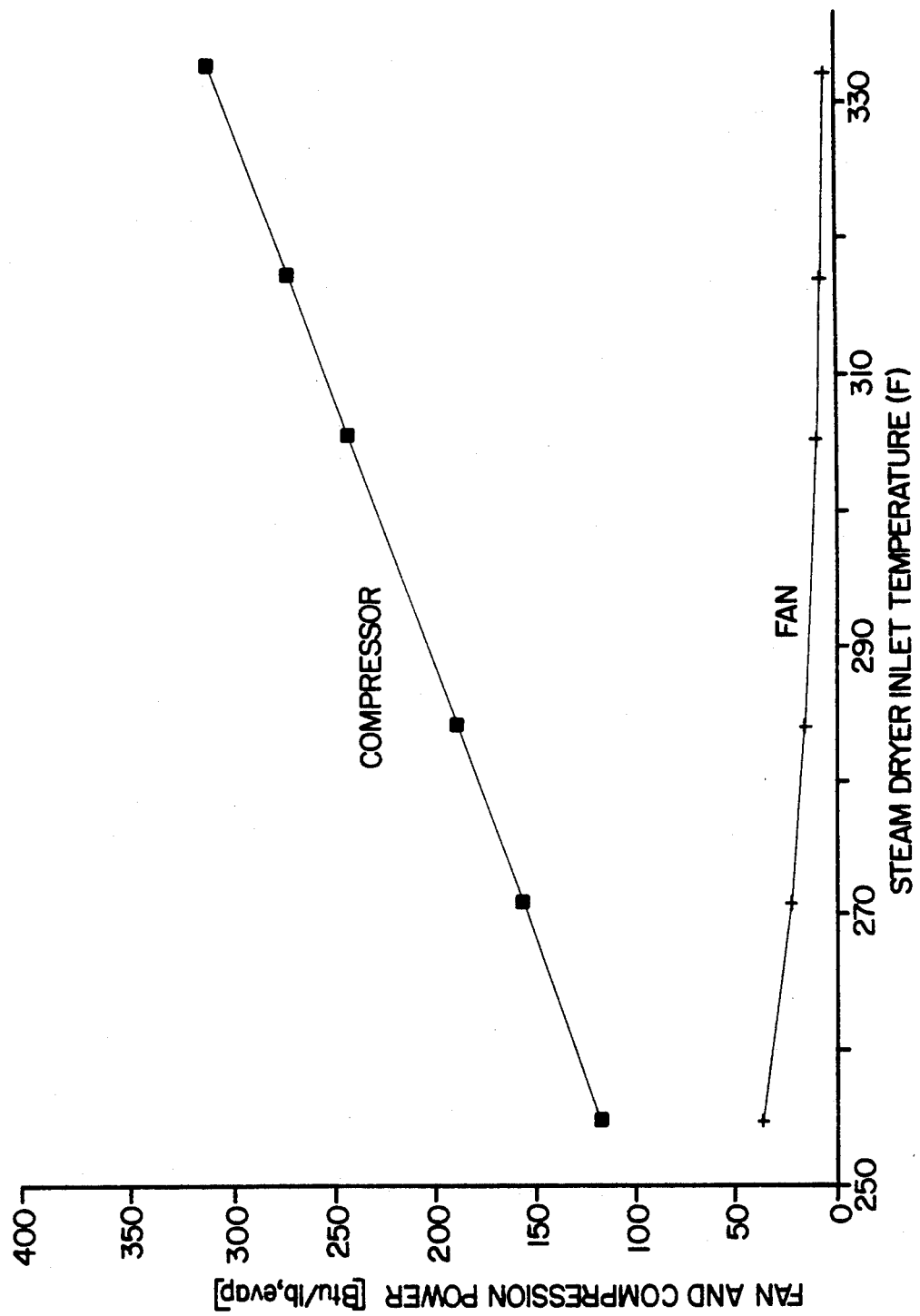
FIG. 15 is a graph illustrating the ISAD system's fan and compressor power consumption.

FIG. 15 displays a plot of the ISAD system's steam compressor 120 and fan 106 power consumption. With a lower recirculation ratio the dryer system's overall volume flow rate is reduced. Consequently, the fan power parasitic is reduced, which ultimately provides a more efficient steam atmosphere drying system. The fan power is drastically reduced compared to the fan power requirements previously observed for the DSAD system. In fact, the lower fan parasitic in the ISAD system results in the constant need for an auxiliary steam heater for the transport steam. Unlike the DSAD's system, the ISAD's fan power input to the system as the thermodynamic irreversibility of the heat input into the transport steam is reduced if it is performed via heat transfer rather than by producing heat energy input from the mechanical energy required to rotate the fan 106.

The ISAD does have a small drawback in that it requires a slightly larger steam compressor discharge pressure. This also results in a slight decrease in the system COP when compared to the DSAD system. These consequences, however, are minor compared to the significant improvements in energy requirements. Compared to the best air standard system where energy heat inputs may range from 1400 to 1700 Btu/lbm, the ISAD system requires an energy input of only 625 to 800 Btu/lb evap for an energy savings of from 43 to 63 percent.

A parametric analysis performed on the ISAD system was also able to detect only small effects of changes in the system pressure drop or compressor discharge pressure, that being steam dryer pinch point, T. The pinch point is the temperature difference between the dryer's inlet steam temperature and the compressor's saturation temperature corresponding to the compressor discharge temperature.

The third and preferred embodiment of the invention is the advanced heated steam atmosphere drying system, hereinafter ASAD, which is illustrated in FIG. 16. This system combines the positive attributes of both the direct and indirect heated steam atmosphere drying systems and incorporates them into one system. As seen in this figure, the ASAD system is very similar to the ISAD system with two notable modifications incorporated therein from the DSAD system. The first modification is the addition of a heat exchanger 222 to receive the steam from the fan 206 and compressor 220 thereby causing the steam to give up its heat of compression and latent heat of evaporation. The steam passing from the heat exchanger 222 to the dryer 202 supplies a substantial amount of heat to the dryer 202. The second modification to the ISAD system concerns the division of compressed steam, a portion of which still goes to the steam jacket 214, while another portion is passed through the heat exchanger 222 and transported to join the condensate from the steam jacket 214. This condensate then combines with injection water from water supply 223 part of which is thereby sent to the compressor 220 to maintain the circulation of steam in the steam jacket 214.

Dryer 202 is employed in combination with recompression system 204 and like the previous embodiments, is responsible for drying wet feedstock particulate matter through the use of recirculated superheated steam. Dryer 202 may internally comprise either the type disclosed in the DSAD system as in FIGS. 2 and 3 or the type disclosed in the ISAD system, as shown in FIGS. 12 and 13. Dryer 202 is shown as having an inlet line 210 whereby wet feedstock which has been heated by feed preheater, may enter, and inlet line 211 whereby superheated steam may enter. Feed preheater 212, an optional feature, reduces the energy requirements by recovering heat from the steam condensate before it leaves the system. The dryer is preferably a vessel 213 comprised of stainless steel, whereby a steam jacket 214 depicted in detail in FIG. 12, surrounds a portion thereof. The superheated steam is separated from the dry feedstock through the use of a separator 218 which may be a CLS or a conventional cyclone separator. The superheated steam separated from the feedstock is circulated through the use of a fan 206, powered by motor 208. After passing from the dryer, part of the steam recirculates through the path of the fan 206 and another part recirculates through the path of compressor 220. The portion of the steam that recirculates through the fan 206 then passes through the heat exchanger 222 and then the steam is further heated in the auxiliary heater 224 so as to step up the temperature of the steam prior to entrance into the dryer 202.

The portion of the steam that passes through compressor 220 provides high pressure steam to the steam jacket 214, which indirectly heats the dryer by the condensate which is formed on the inner wall of the vessel. Compressor 220 also like that of the DSAD system sends part of the compressed steam to the heat exchanger and the condensate therefrom then combines with condensate from the steam jacket 214 and injection water from the water supply 222, which travels back to the compressor thereby causing recirculation of steam back to the steam jacket 214 and also directly to the dryer 202. Thus, the flowrate of steam to the drying vessel 213 is reduced, thereby enabling the size of the vessel 213 to be reduced in comparison to the vessel 13 of FIGS. 2 and 3. This system is the most energy efficient.

The energy savings brought about by utilizing both the direct and the indirect steam atmosphere drying system are significant. In addition to the energy savings of the steam dryer system there are several other advantages that are important to its being accepted by the industrial dryer user. Such additional advantages include; a 35% reduction in the yearly cost per lb evap to dry wet feedstock, reduced airborne emissions of both feedstock effluent and combustion exhaust products by 75,000 tons/yr. and by 5,800 tons/yr., respectively, reduced dry dust fire/explosion risks, hot product not exposed to oxygen, constant rate drying in steam atmosphere, water mass transfer in product enhanced, dryer controls simplified, reduced dryer size, reduced dryer cost, reduced dryer heat losses due to lower dryer inlet temperatures.

Figure 17:
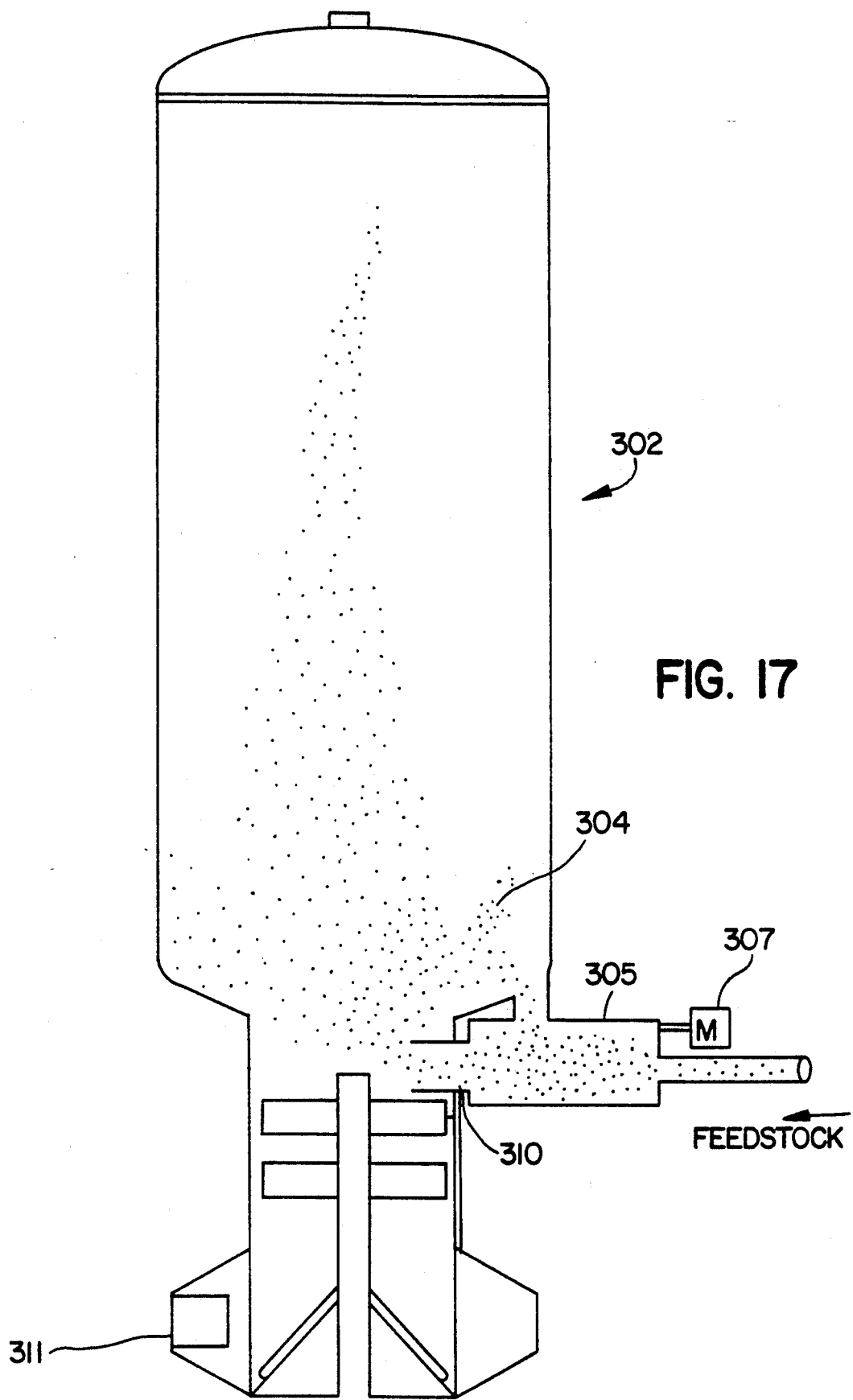
FIG. 17 illustrates the use of inert material for more uniform drying of feedstock.

In order to enhance the dispersion of a pumpable wet slurry feedstock and aid in the water evaporation process in each of the above disclosed systems, the DSAD, ISAD and ASAD systems, an optional supply of inert substrate material may be added to the incoming feedstock prior to its its mixing with the superheated steam and entry into the dryer 302, as shown in FIG. 17. The inert material used should advantageously have a uniform size thereby making drying time more predictable. Such a supply would be circulated from the dryer by inert material conveyer 305, powered by motor 307, whereby this inert material would mix with incoming feedstock and serve to preheat the feedstock slurry prior to its admission into the dryer inlet 310.

The use of an inert substrate material enables small dried feedstock material to be retained in the the dryer 302 a shorter amount of time for less recirculation. The feedstock leaves the dryer 302 quickly after drying and thus is not overheated as sometimes occurs with flash or spray drying systems. Since the residence time in the dryer 302 is reduced, the dryer size is reduced. The use of the inert material in the dryer system also facilitates the use of a staged dryer system as outlined in FIG. 5. In such a system the dryer can serve as a first stage dryer and a fluidized bed, using the same inert material, can serve as the final, second drying stage. The combined first and second stage system can be used to further reduce the moisture content in the feedstock. Thus, the inert material serves to enhance heat transfer. The inert material conducts heat to the feedstock coating even as the drying medium convects heat to the feedstock.

The inventory of inert material in circulation within the dryer is independent upon the steam mass flowrate, inert particle size, dryer length and diameter and particle conveyer speed. A maximum particle inventory is reached as a function of these system parameters. By selecting the proper values for these dryer characteristics, the dried inert particles will fall to the bottom 304 of the steam dryer, and will recirculated to the conveyor 305 eventually return to the dryer 302.

This invention is not to be limited to the drying of any specific type or particulate matter, but has broad range applications for a variety of different industrial uses. Various modes of carrying out the invention are contemplated as being within the scope of the following claims particularly pointing out and distinctly claiming the invention.

We hereby claim:

1. A heated steam atmosphere dryer system comprising;

dryer means comprising a vessel having an inlet and an outlet, for receiving and discharging, respectively, steam and particulate matter, and means for creating a pressure differential within said vessel, said means for creating a pressure differential comprising a turbulator for generating centrifugal forces within said vessel, said turbulator responsible for forming a plurality of recirculation paths therein, separator means for separating said steam from said particulate matter, recompression means for recirculating said steam and for effecting the recovery of heat of evaporation and heat of compression of said steam so as to provide heat to said dryer means.

2. The system of claim 1, said dryer means further comprising;

means for directly providing heat to said dryer.

3. The system of claim 2, said dryer means further comprising means for indirectly providing heat to said dryer.

4. The system of claim 2, said means for directly providing heat to said dryer further comprising a heat exchanger.

5. The system of claim 3, said means for directly providing heat to said dryer further comprising an auxiliary heater.

6. The system of claim 1, said dryer means further comprising internal tubing means adapted to accept steam from said recompression means.

7. The system of claim 6, said internal tubing means further comprising means for providing increased surface area for heat dispersion.

8. The system of claim 3, wherein said means for indirectly providing heat encases an external part of said vessel.

9. The system of claim 3, wherein said means for indirectly providing heat causes the formation of condensation inside said vessel.

10. The system of claim 1, further comprising;
means for providing an inert substrate to be introduced into said dryer thereby enhancing the rate of drying of said particulate matter.

11. A heated steam atmosphere dryer system for providing energy efficient drying of matter, comprising;
a dryer comprising;
a vessel having an internal chamber,
inlet means for receiving wet particulate matter and steam into said internal chamber, whereby the steam is a medium for drying said wet particulate matter,
encasing means for receiving steam externally of said vessel so as to provide indirect heat to said internal chamber,
means for creating a pressure differential within said vessel, said means for creating a pressure differential comprising a turbulator for generating centrifugal forces within said internal chamber resulting in at least one recirculation path comprised of a mixture of steam and particulate matter,
a separator comprising;
means for receiving steam and particulate matter from said internal chamber,
means for separating said particulate matter from said steam,
means for permanently withdrawing separated particulate matter away from said system,
a recompression system comprising;
compressor means for receiving and compressing said steam from said separator and transporting a first portion of said steam to said encasing means,
exchanger means for receiving a second portion of said steam from said compressor, for heating and transporting steam to said inlet means,
whereby energy efficient drying of particulate matter is effected through recirculation of steam through said recompression system.

12. The system of claim 11, said means for separating comprising a curvilinear louvered separator.

13. The system of claim 12, said curvilinear louvered separator further comprising:
a circular structure having louvers mounted thereon for collecting particular matter from steam as said mixture spirals therethrough.

14. The system of claim 11, said dryer further comprising a heating structure in said internal chamber.

15. The system of claim 14 said heating structure further comprising circuit means comprising a helically shaped tubing for the passage of steam therethrough.

16. The system of claim 14, said heating structure further comprising tubing having fins mounted thereon for providing increased heating surface area.

17. The system of claim 11, said, encasing means further comprising steam jacket surrounding at least one steam portion of said vessel.

18. The system of claim 17, said steam jacket further comprising curved plates having helically coiled tubes mounted thereon.

19. The system of claim 11, further comprising means for supplying inert material to said dryer, thereby increasing the rate of drying time of the particulate.

20. The system of claim 11, said dryer further comprising an external recirculation line.

21. An indirectly heated steam atmosphere dryer system for providing energy efficient drying of matter, comprising;
a dryer comprising;
a vessel having an internal chamber,
inlet means for receiving wet particulate matter and steam into said internal chamber, whereby the steam is a medium for drying said wet particulate matter,
encasing means for receiving steam externally of said vessel so as to provide indirect heat to said internal chamber,
means for creating a pressure differential within said vessel, said means for creating a pressure differential comprising a turbulator for generating centrifugal forces within said internal chamber resulting in at least one recirculation path comprised of a mixture of steam and particulate matter,
a separator comprising;
means for receiving steam and particulate matter from said internal chamber,
means for separating said particulate matter from said steam,
means for permanently withdrawing separated particulate matter away from said system,
a recompression system comprising:
compressor means for receiving and compressing a first portion of said steam from said separator and transporting said first portion of said steam to said encasing means,
fan means for receiving and transporting a second portion of steam from said separator to said inlet means,
whereby energy efficient drying of particulate matter is effected through the use of recirculated steam.

22. A directly heated steam atmosphere dryer system for providing energy efficient drying of matter, comprising;
a dryer comprising;
a vessel having an internal chamber,
inlet means for receiving wet particulate matter and steam into said internal chamber, whereby the steam is a medium for drying said wet particulate matter,
means for creating a pressure differential within said vessel, said means for creating a pressure differential comprising a turbulator for generating centrifugal forces within said internal chamber resulting in at least one recirculation path comprised of a mixture of steam and particulate matter,
a separator comprising;
means for receiving steam and particulate matter from said internal chamber,
means for separating said particulate matter from said steam, means for permanently withdrawing separated particulate matter away from said system,
a recompression system comprising:
  compressor means for receiving and compressing said steam from said separator;
  heat exchanger means for receiving said steam from said compressor means, heating said steam and transporting it to said inlet means,
whereby energy efficient drying of particulate matter is effected through the use of recirculated steam.

* * * * *

UNITED STATES PATENT AND TRADEMARK OFFICE
CERTIFICATE OF CORRECTION

PATENT NO. : 5,291,668
DATED : March 8, 1994
INVENTOR(S) : Frederick E. Becker, et al It is certified that error appears in the above-indentified patent and that said Letters Patent is hereby corrected as shown below:

Col. 14, line 1, after "said" delete ","; line 2, after "comprising" insert --at least one--; line 2, after "surrounding" delete "at least" and insert --a--; line 3, before "portion" delete "one steam"; line 65, after "receiving" insert --said--.

Signed and Sealed this

Twenty-seventh Day of September, 1994

Attest:

BRUCE LEHMAN

Attesting Officer     Commissioner of Patents and Trademarks